United States Patent
Higuchi (10) Patent No.: US 7,499,952 B2
(45) Date of Patent: Mar. 3, 2009

(54) DIGITAL CAMERA AND IMAGE DATA RECORDING METHOD

(75) Inventor: Masayu Higuchi, Hino (JP)

(73) Assignee: Olympus Corporation, Tokyo (JP)

( * ) Notice: Subject to any disclaimer, the term of this patent is extended or adjusted under 35 U.S.C. 154(b) by 409 days.

(21) Appl. No.: 11/176,824

(22) Filed: Jul. 7, 2005

(65) Prior Publication Data

US 2006/0023082 A1 Feb. 2, 2006

(30) Foreign Application Priority Data

Jul. 28, 2004 (JP) .............................. 2004-220602

(51) Int. Cl.
*G06F 17/30* (2006.01)
(52) U.S. Cl. ................. 707/201; 707/10; 707/104.1
(58) Field of Classification Search .............. 707/10, 707/104.1, 200, 201, 202, 203, 204, 205; 358/1.6, 2.1, 1.13, 1.15, 400, 403; 717/139; 348/231.6; 709/219; 701/209
See application file for complete search history.

(56) References Cited

U.S. PATENT DOCUMENTS

| | | | |
|---|---|---|---|
| 6,523,046 B2* | 2/2003 | Liu et al. ................. | 707/104.1 |
| 7,301,658 B2* | 11/2007 | Henry ....................... | 358/1.15 |
| 2002/0116575 A1* | 8/2002 | Toyomura et al. ........... | 711/115 |
| 2002/0118285 A1 | 8/2002 | Misawa et al. | |
| 2003/0110297 A1* | 6/2003 | Tabatabai et al. ........... | 709/246 |
| 2004/0015535 A1* | 1/2004 | Amielh-Caprioglio et al. ... | 709/200 |
| 2004/0114042 A1* | 6/2004 | Paolini et al. .......... | 348/207.99 |

FOREIGN PATENT DOCUMENTS

| | | |
|---|---|---|
| CN | 1373602 A | 10/2002 |
| JP | 2002-044592 | 2/2002 |

OTHER PUBLICATIONS

Chinese Office Action for Chinese Patent Application No. 200510087325.9, mailed on Jun. 13, 2008 (3 pgs.) (with English Translation (4 pgs.)).

* cited by examiner

*Primary Examiner*—Diane Mizrahi
(74) *Attorney, Agent, or Firm*—Straub and Pokotylo; John C. Pokotylo (57) ABSTRACT

A digital camera includes an image shooting section which obtains at least one set of image data by shooting. A metadata creating section creates metadata including a plurality of data elements indicative of information concerning the at least one set of image data obtained by the image shooting section. A recording section records in a recording medium at least one file having a first format in which metadata is added to the at least one set of image data and a file having a second format including metadata only.

11 Claims, 11 Drawing Sheets

```
<Image information>
   <Image information 1>
   <Shooting information>
      <Shutter speed>1/30</Shutter speed>
      <Aperture>F2.8</Aperture>
         ⋮
   </Shooting information>
   <File information>
      <File name>P1000001.jpg</File name>
      <File size>500KB</File size>
         ⋮
   </File information>
   </Image information 1>
</Image information>
```

FIG. 3

```
<?xml version = "1.0" encoding = "shift_JIS" ?>
<?xml - stylesheet type = "text/xml" href = "PicInfo.xsl" ?>
```

FIG. 4

```
<?xml version = "1.0" encoding = "Shift_JIS" ?>

<xsl : stylesheet version = "1.0" xmlns : xsl = "http: / / www.w3.org/1999/XSL/Transform">
<xsl : output method = "html" version = "4.01" encoding = "Shift_JIS" indent = "yes" />

<xsl : template match = " / ">
<html lang = "ja">
  <head>
    <title>File information</title>
    <style type = "text/css">・・・</style>
  </head>
  <body>
    <xsl : apply - templates select = "Image information"/>
  </body>
</html>
</xsl : template>

<xsl : template match = "Image information">
  ・・・
</xsl : template>
```

F I G. 5

```xml
<?xml version = "1.0" encoding = "Shift_JIS" ?>
<?xml-stylesheet type = "text/xml" href = "PicInfo.xsl" ?>
<Image information>
<Image information 1>
    <Shooting information>
        <Shutter speed>1/30</Shutter speed>
        <Aperture>F2.8</Aperture>
        .
        .
        .
    </Shooting information>
    <File information>
        <File name>P1000001.jpg</File name>
        <File size>500KB</File size>
        .
        .
        .
    </File information>
</Image information 1>

<Image information 2>
    <Shooting information>
        <Shutter speed>1/60</Shutter speed>
        <Aperture>F5.6</Aperture>
        .
        .
        .
    </Shooting information>
    <File information>
        <File name>P1000002.jpg</File name>
        <File size>600KB</File size>
        .
        .
        .
    </File information>
</Image information 2>
</Image information>
```

```
<Image information>
    <Shooting information>
        <Shutter speed>1/30</Shutter speed>
        <Aperture>F2.8</Aperture>
        <Date>2004/6/14/</Date>
        <ISO sensitivity>ISO800</ISO sensitivity>

</Shooting information>
    <File information>
        <File name>P1000001.jpg</File name>
        <File size>500KB</File size>
            .
            .
            .
    </File information>
    <raw development information>
        <Sharpness>Strong</Sharpness>
        <WB>5500K</WB>
        <Chroma>Bright</Chroma>
            .
            .
            .
    </raw development information>
    <Comment></Comment>

</Image information>
```

FIG. 10

```
     :
     :
<raw development information>
   <Sharpness>Weak</Sharpness>

:
     :

</raw development information>
<Comment>Athletic meeting</Comment>
     :
     :
```

FIG. 11

```
<Image information>
   <Image information 1>
   <Shooting information>
      <Shutter speed>1/30</Shutter speed>
      <Aperture>F2.8</Aperture>
        :
        :
   <Editing></Editing>
   </Shooting information>
   <File information>
      <File name>P1000001.jpg</File name>
      <File size>500KB</File size>
        :
        :
   </File information>
   </Image information 1>
</Image information>
```

FIG. 12

```
        :
        :
<Shooting information>
        :
        :
    <Editing>Monochrome</Editing>
        :
        :
</Shooting information>
```

DIGITAL CAMERA AND IMAGE DATA RECORDING METHOD

CROSS-REFERENCE TO RELATED APPLICATIONS

This application is based upon and claims the benefit of priority from prior Japanese Patent Application No. 2004-220602, filed Jul. 28, 2004, the entire contents of which are incorporated herein by reference.

BACKGROUND OF THE INVENTION

1. Field of the Invention

The present invention relates to a digital camera and a data recording method which record digital image data.

2. Description of the Related Art

There have been made various kinds of proposals in relation to a technique which adds information concerning image data as metadata in order to retrieve or manage image data. For example, in a proposal of Jpn. Pat. Appln. KOKAI No. 2002-44592, metadata which is repeatedly used is created in advance as attached information of binary data such as image data, and this created metadata is repeatedly added to a plurality of sets of binary data. Such a technique readily enables generation of binary data having metadata.

BRIEF SUMMARY OF THE INVENTION

According to a first aspect of the present invention, there is provided a digital camera comprising:

an image shooting section which obtains at least one set of image data by shooting;

a metadata creating section which creates metadata comprising a plurality of data elements indicative of information concerning the at least one set of image data obtained by the image shooting section; and a recording section which records in a recording medium at least one file having a first format in which the metadata is added to the at least one set of image data and a file having a second format comprising the metadata only.

According to a second aspect of the present invention, there is provided a digital camera comprising:

an image shooting section which obtains at least one set of image data by shooting;

a metadata creating section which creates metadata comprising a plurality of data elements indicative of information concerning the at least one set of image data obtained by image shooting section;

a recording section which records in a recording medium at least one file having a first format in which the metadata is added to the at least one set of image data; and a metadata judgment section which judges whether a file having a second format comprising the metadata only is recorded in the recording medium, wherein, when the metadata judgment section judges that the file having the second format is not recorded in the recording medium, the recording section creates the file having the second format from the metadata included in the at least one file having the first format and records the created file in the recording medium.

According to a third aspect of the present invention, there is provided an image data recording method comprising:

obtaining at least one set of image data by shooting;

creating metadata comprising a plurality of data elements indicative of information concerning the at least one set of obtained image data;

recording in a recording medium at least one file having a first format in which the metadata is added to the at least one set of image data and a file having a second format comprising the metadata only;

judging whether one of the metadata included in the at least one file having the first format and the metadata included in the file having the second format is updated; and synchronizing the metadata included in the at least one file having the first format with the metadata included in the file having the second format by replacing the other metadata with the updated metadata when it is determined that one of the two sets of metadata is updated by the judgment.

According to a fourth aspect of the present invention, there is provided an image data recording method comprising:

obtaining at least one set of image data by shooting;

creating metadata comprising a plurality of data elements indicative of information concerning the at least one set of obtained image data;

recording in a recording medium at least one file having a first format in which the metadata is added to the at least one set of image data;

judging whether a file having a second format comprising the metadata only is recorded in the recording medium; and creating the file having the second format from the metadata included in the at least one file having the first format and recording the created file in the recording medium when it is judged that the file having the second format is not recorded in the recording medium by the judgment.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will now be described hereinafter with reference to the accompanying drawings.

First Embodiment

Figure 1:
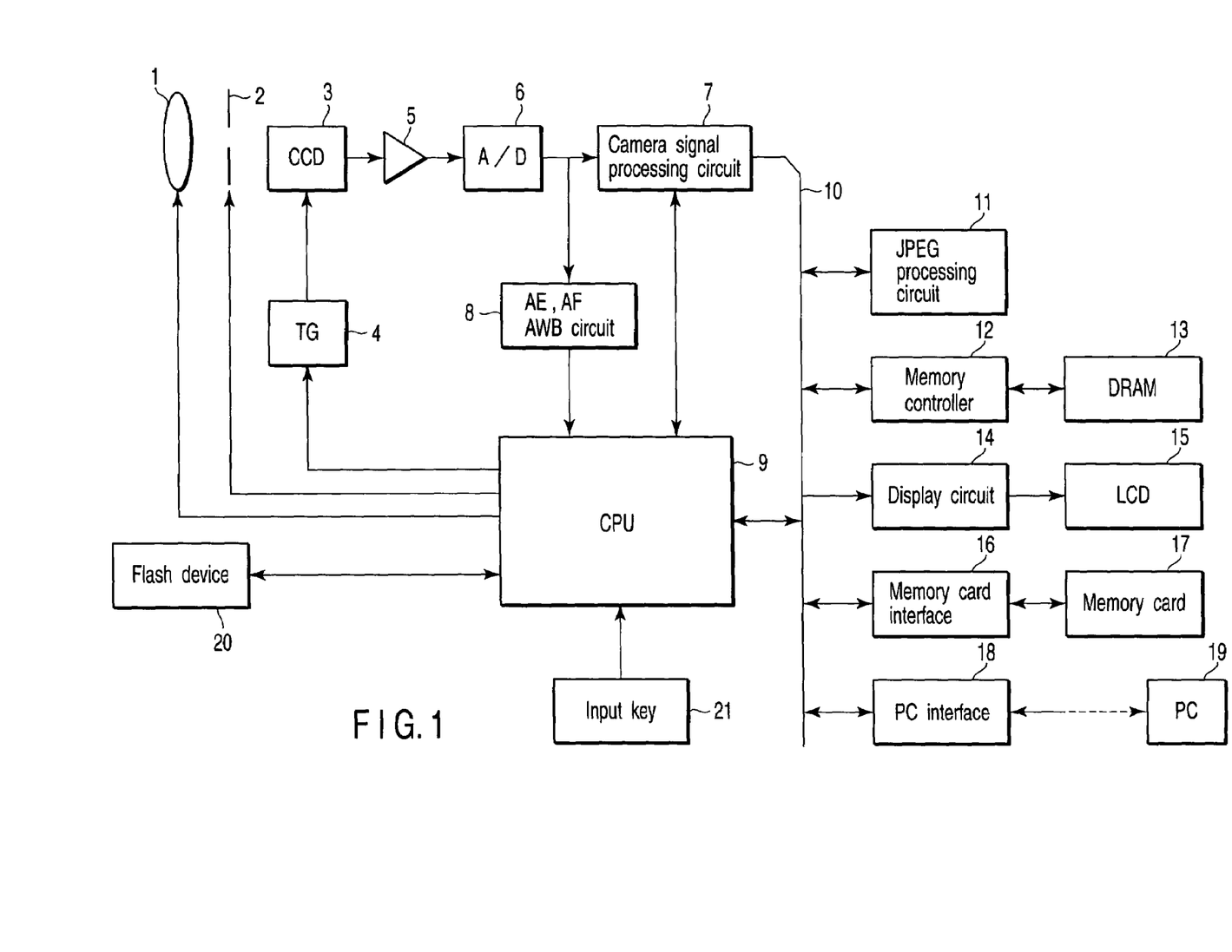
FIG. 1 is a block diagram showing a configuration of a digital camera according to a first embodiment of the present invention.

A first embodiment according to the present invention will now be described. FIG. 1 is a block diagram showing a configuration of a digital camera (which will be referred to as a camera hereinafter) according to the first embodiment of the present invention.

A shooting lens 1 forms an image of a light beam from a non-illustrated subject on a predetermined image forming surface. An aperture diaphragm 2 is arranged on an optical axis of the shooting lens 1. This aperture diaphragm 2 adjusts an incident light quantity of a light beam which has entered through the shooting lens 1. A CCD 3 is arranged on the image forming surface of the shooting lens 1. This CCD 3 performs photoelectric conversion of an incident light beam to obtain an image signal. A timing generator (TG) 4 controls a read timing of an image signal obtained by the CCD 3.

An amplifier 5 amplifies an image signal read from the CCD 3 with a predetermined gain. An analog-to-digital conversion circuit 6 performs digital conversion of an output image signal from the amplifier 5 to obtain image data. A camera signal processing circuit 7 carries out various kinds of image processing such as white balance (WB) processing or gradation conversion processing based on output image data from the analog-to-digital conversion circuit 6. An AE, AF and AWB circuit 8 performs automatic exposure (AE) detection, automatic focus (AF) detection and automatic white balance (AWB) detection based on output image data from the analog-to-digital conversion circuit 6.

A CPU 9 is a control section which entirely controls this camera, and carries out processing such as an AE calculation, an AF calculation, a white balance gain calculation and others based on a result obtained by the AE, AF and AWB circuit 8. Further, the CPU 9 also performs driving control of the aperture diaphragm 2 and driving control of the TG 4 in accordance with a result of the AE calculation, and focus control of the shooting lens 1 in accordance with a result of the AF calculation.

A bus 10 is a data transfer path through which output image data from the analog-to-digital conversion circuit 6 or image data subjected to image processing in the camera signal processing circuit 7 as well as various kinds of data are transferred. To this bus 10 are connected the camera signal processing circuit 7, the CPU 9, a JPEG processing circuit 11, a memory controller 12, a display circuit 14, a memory card interface 16 and a PC interface 18.

The JPEG processing circuit 11 is a circuit which performs JPEG compression processing of image data processed in the camera signal processing circuit 7 and expansion processing of image data subjected to JPEG compression. The memory controller 12 is a circuit which controls storage of data in a DRAM 13. The display circuit 14 is a circuit which performs control when displaying a shot image in an LCD 15. The memory card interface 16 is a circuit which performs recording control when recording an image file or the like in a recording medium (which will be referred to as a memory card hereinafter) 17 such as a memory card detachably constituted with respect to this camera. The PC interface 18 is a circuit which mediates communication between this camera and a PC 19 connected with this camera.

A flash device 20 illuminates a subject when, e.g., the illuminance of the subject is low, and comprises a light source and a light source drive circuit.

An input key 21 is an operation key group including a power supply button which turns on a power supply of the camera, a release button which starts the shooting and others.

File creation processing at the time of shooting an image by the camera having such a configuration as shown in FIG. 1 will now be described.

Figure 2A:
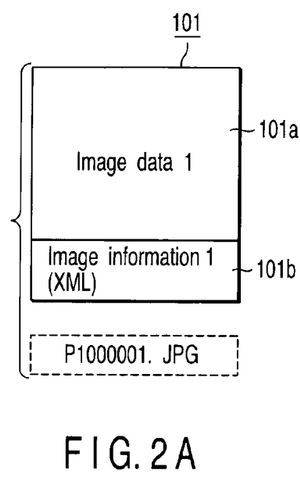
FIGS. 2A to 2C are views showing a file created at the time of shooting a first image.
Figure 2B:
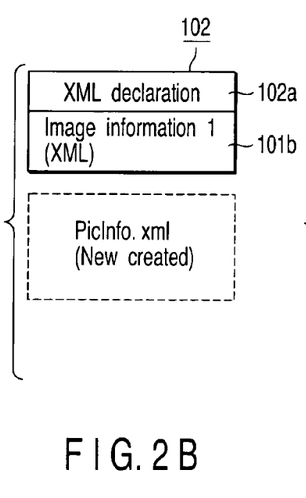
Figure 2C:
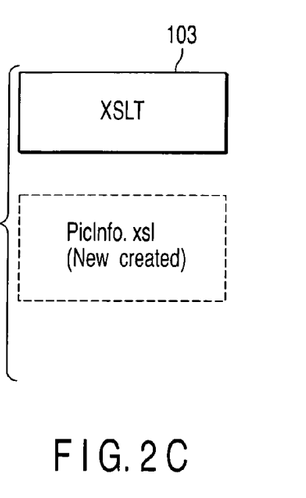

A description will be first given as to file creation processing at the time of shooting (which will be referred to as the shooting of a first image hereinafter) when an image file is not recorded in the memory card 17. When the shooting of a first image is performed by an image shooting section comprising the shooting lens 1, the CCD 3, the analog-to-digital conversion circuit 6, the camera signal processing circuit 7 and others, such an image file 101 as shown in FIG. 2A is created, a metafile 102 and an XSL file 103 such as shown in FIGS. 2B and 2C are also created, and these three files are recorded in the memory card 17.

The image file (a file name: P1000001.JPG) 101 as a file having a first format shown in FIG. 2A comprises an image data portion (which is shown as image data 1 in the drawing) 101a in which image data obtained by the shooting of the first image is recorded and an image information portion (which is shown as image information 1 in the drawing) 101b in which image information concerning image data obtained by the shooting of the first image is recorded.

Image data recorded in the image data portion 101a is image data (JPEG image data) subjected to compression processing in the JPEG processing circuit 11 or output image data (raw image data) from the analog-to-digital conversion circuit 6.

On the other hand, image information recorded in the image information portion 101b is information concerning image data obtained in the shooting. In the first embodiment, shooting information indicative of shooting conditions or the like in the shooting and file information concerning an image file created in the shooting are written as image information. In this example, as data elements included in the shooting information, there are, e.g., a shutter speed, an aperture value in the shooting and others. Furthermore, as data elements included in the file information, there are, e.g., a file name, a file size and others.

Moreover, the image information portion 101b is created as metadata using an extensible markup language (XML) format. The XML is one of markup languages in which information is written by using a tag. In this XML, information can be written as text data. Additionally, as different from a hyper text markup language (HTML), the XML enables a user to create a tag without restraint.

Figure 3:
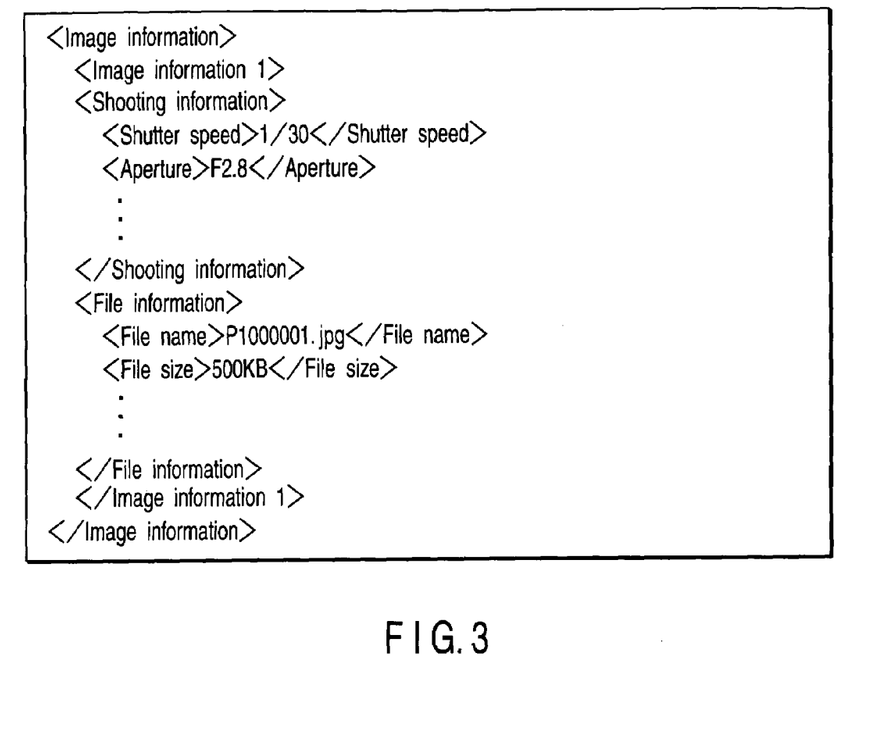
FIG. 3 is a view showing an image information portion.

FIG. 3 is a view showing an example of the image information portion 10b. It is to be noted that FIG. 3 shows image information when the image data is JPEG image data. As shown in FIG. 3, the image information portion 101b has a hierarchical configuration in which a shooting information tag which is used to write shooting information and a file information tag which is used to write file information are provided in a root tag called an image information tag.

In the image file created as shown in FIG. 2A, the image information written in the image information portion 101b cannot be extracted unless a dedicated device or application software is used. Therefore, there is almost no possibility of loss of the image information written in the image information portion 101b from the image file.

Further, the metafile (a file name: PicInfo.xml) 102 as a file having a second format shown in FIG. 2B comprises an XML declarative portion 102a and the image information portion 101b.

Figure 4:
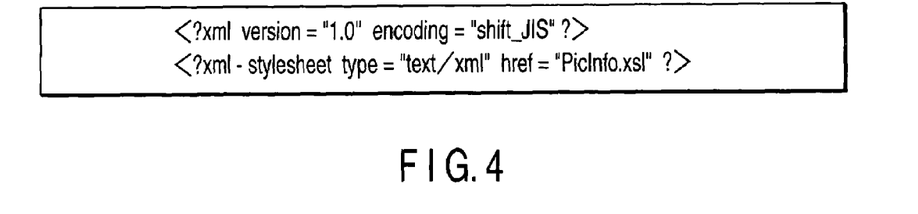
FIG. 4 is a view showing an XML declarative portion.

The XML declarative portion 102a is a portion indicating a version of the XML, a character encoding method or the like, and written as shown in FIG. 4. In this example, as the XML declarative portion 102a shown in FIG. 4, one standardized by the World Wide Web Consortium (W3C) can be used as it is. Here, the detailed description thereof will be eliminated.

Furthermore, in the XML declarative portion 102a shown in FIG. 4, an XSL file (a file name: PicInfo.xsl) 103 is specified in a style sheet. By specifying the XSL file 103 in the style sheet, the image information written as the XML data can be converted into HTML data, and a content written in the metafile (PicInfo.xml) 102 can be thereby displayed in a Web browser.

Figure 5:
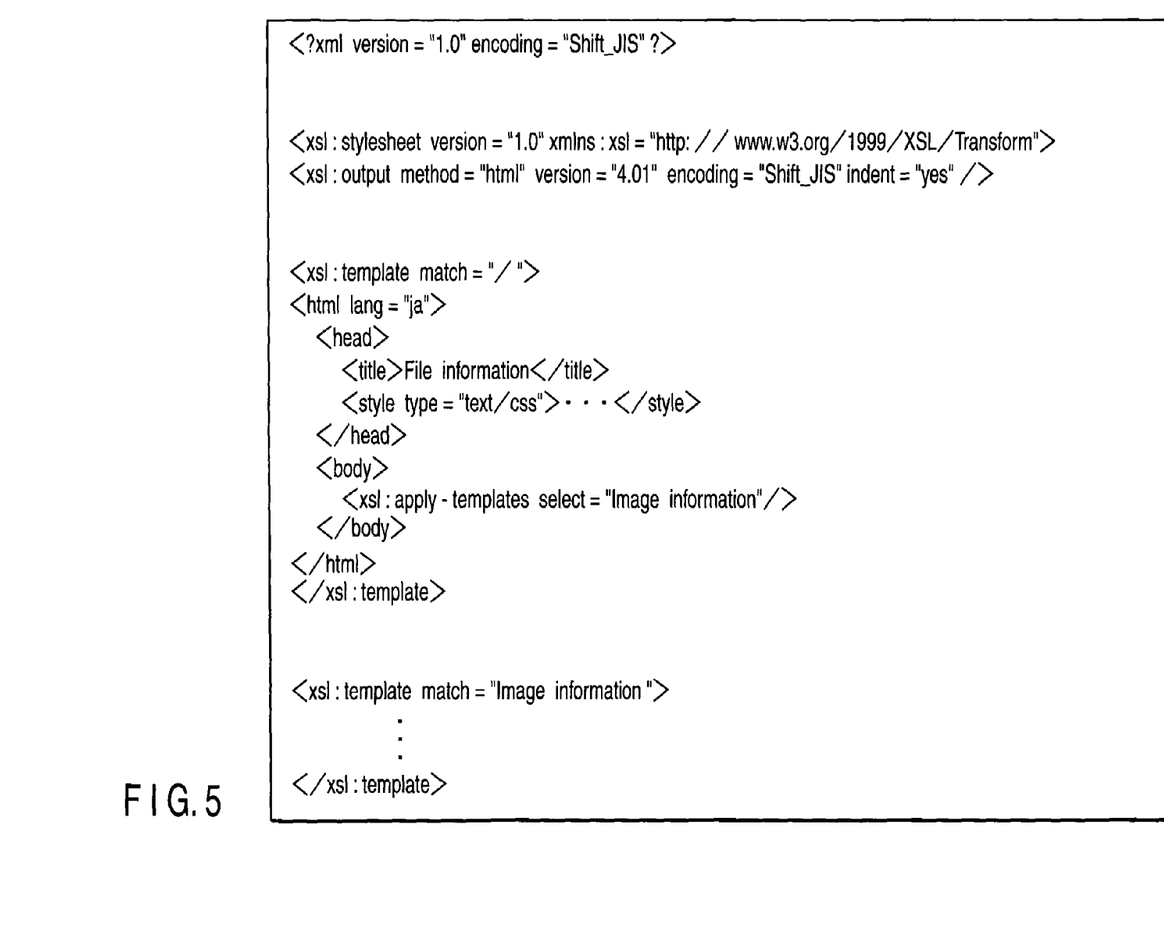
FIG. 5 is a view showing an XSL file.

The XSL file (PicInfo.xsl) 103 as a file having a third format shown in FIG. 2C is a file written in a format called XSLT shown in FIG. 5. This XSLT is also standardized in W3C. Here, the detailed explanation will be eliminated.

File creation processing at the time of shooting a second image will now be described. The same file creation processing as that of the second image shooting is performed at the time of shooting a third image and subsequent images.

Figure 6A:
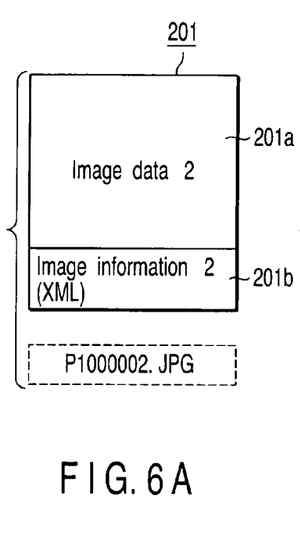
FIGS. 6A to 6C are views showing a file at the time of shooting a second image.
Figure 6B:
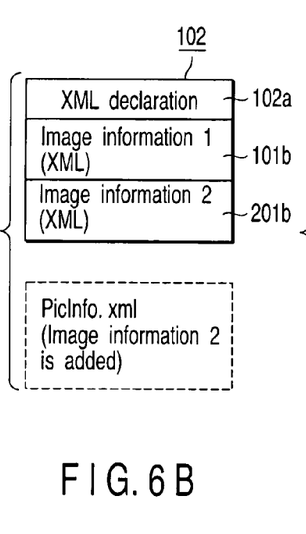
Figure 6C:
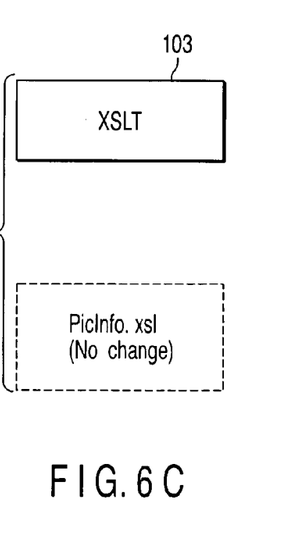
Figure 7:
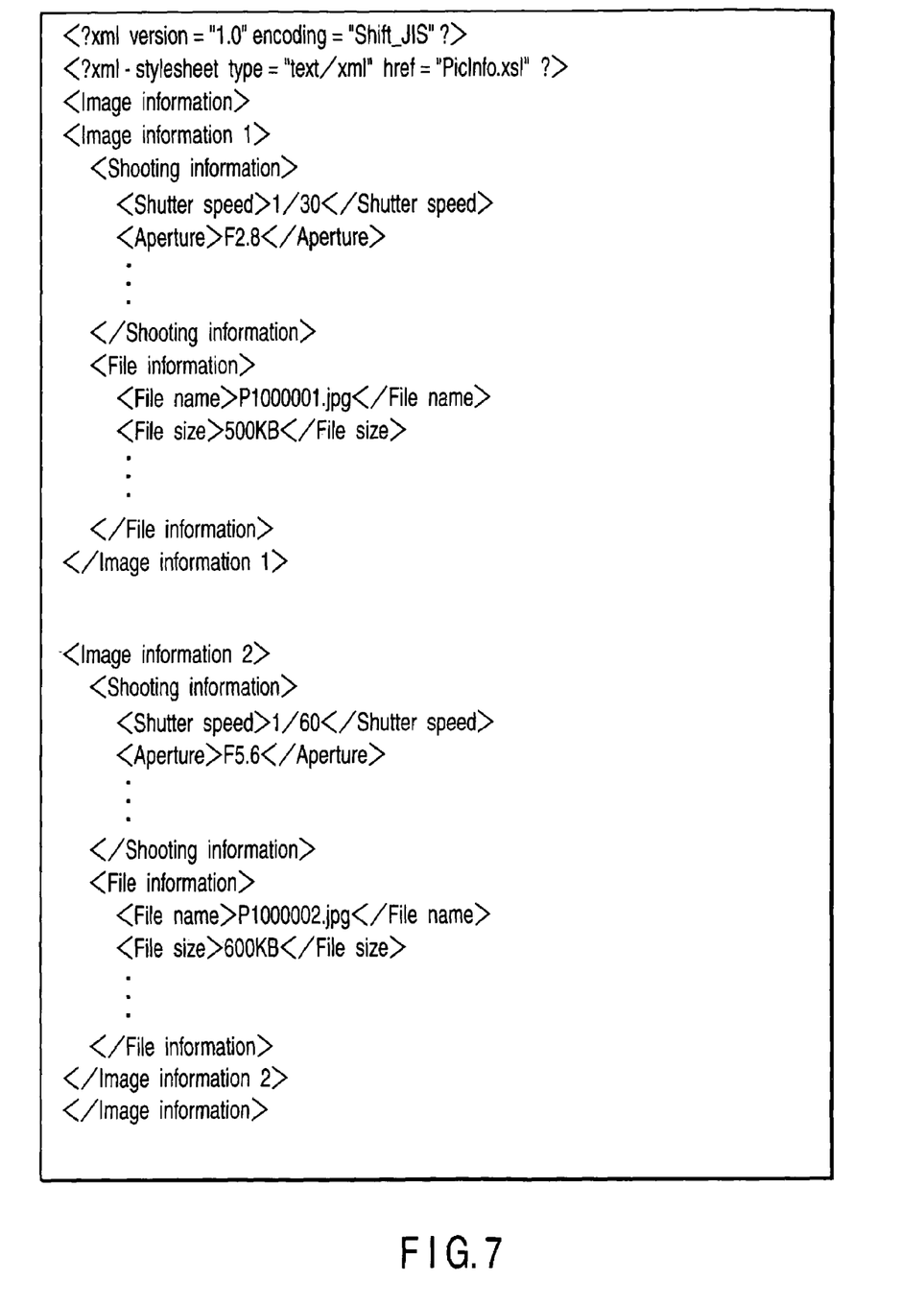
FIG. 7 is a view showing an image information portion at the time of shooting the second image.

At the time of shooting the second image, an image file (a file name: P1000002.JPG) 201 comprising such an image data portion (shown as image data 2 in the drawing) 201a in which image data acquired at the time of shooting the second image is recorded as shown in FIG. 6A and an image information portion (shown as image information 2 in the drawing) 201b in which image information concerning the image data acquired at the time of shooting the second image is recorded is newly created. Furthermore, as shown in FIG. 6B, the image information portion 201b concerning the second image data is added to the metafile (PicInfo.xml) 102. FIG. 7 shows the metafile (PicInfo.xml) 102 to which the image information 201b concerning the second image is added. In this example, the XSL file (PicInfo.xsl) 103 is not changed (see FIG. 6C).

As described above, according to the first embodiment, the image information written as the XML data in the metafile can be readily read by using a universal technique such as a Web browser. Moreover, since the image information is also recorded in the image file, the relevance between the image information and the image data is not lost.

Second Embodiment

A second embodiment according to the present invention will now be described. The second embodiment according to the present invention is an example of newly creating a metafile (PicInfo.xml) when, e.g., a user accidentally deletes a metafile (PicInfo.xml). It is to be noted that a hardware configuration is the same as that described in conjunction with FIG. 1. However, the CPU 9 in the second embodiment has a function as a metadata judgment section which judges whether a metafile (PicInfo.xml) is recorded in the memory card 17.

Figure 8:
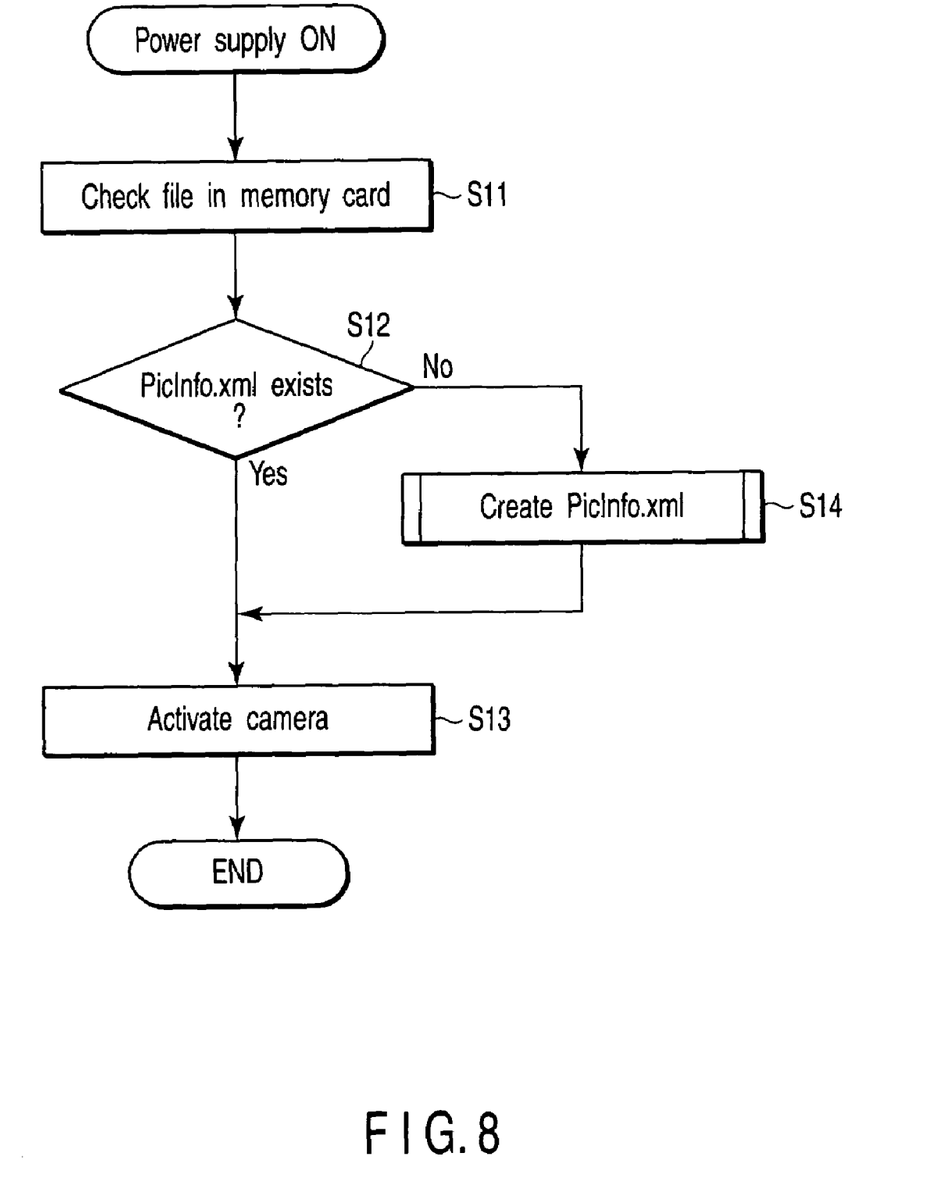
FIG. 8 is a flowchart showing metafile judgment processing in a second embodiment according to the present invention.

FIG. 8 is a flowchart showing metafile judgment processing which is performed immediately after the power supply of the camera is turned on. This processing of FIG. 8 is executed in the CPU 9.

After turning on the power supply, the CPU 9 checks a file in the memory card 17 (step S11). As a result of the file check at step S11, the CPU 9 judges whether a metafile (PicInfo.xml) exists in the memory card 17 (step S12).

If it is determined that the metafile (PicInfo.xml) exists in the memory card 17 as a result of the judgment at step S12, step S12 jumps to step S13 where the CPU 9 executes regular camera activation processing (step S13). On the other hand, if it is determined that the metafile (PicInfo.xml) does not exist in the memory card 17 as a result of the judgment at step S12, step S12 jumps to step S14 where the CPU 9 executes metafile (PicInfo.xml) creation processing (step S14). Thereafter, the processing advances to step S13.

Figure 9:
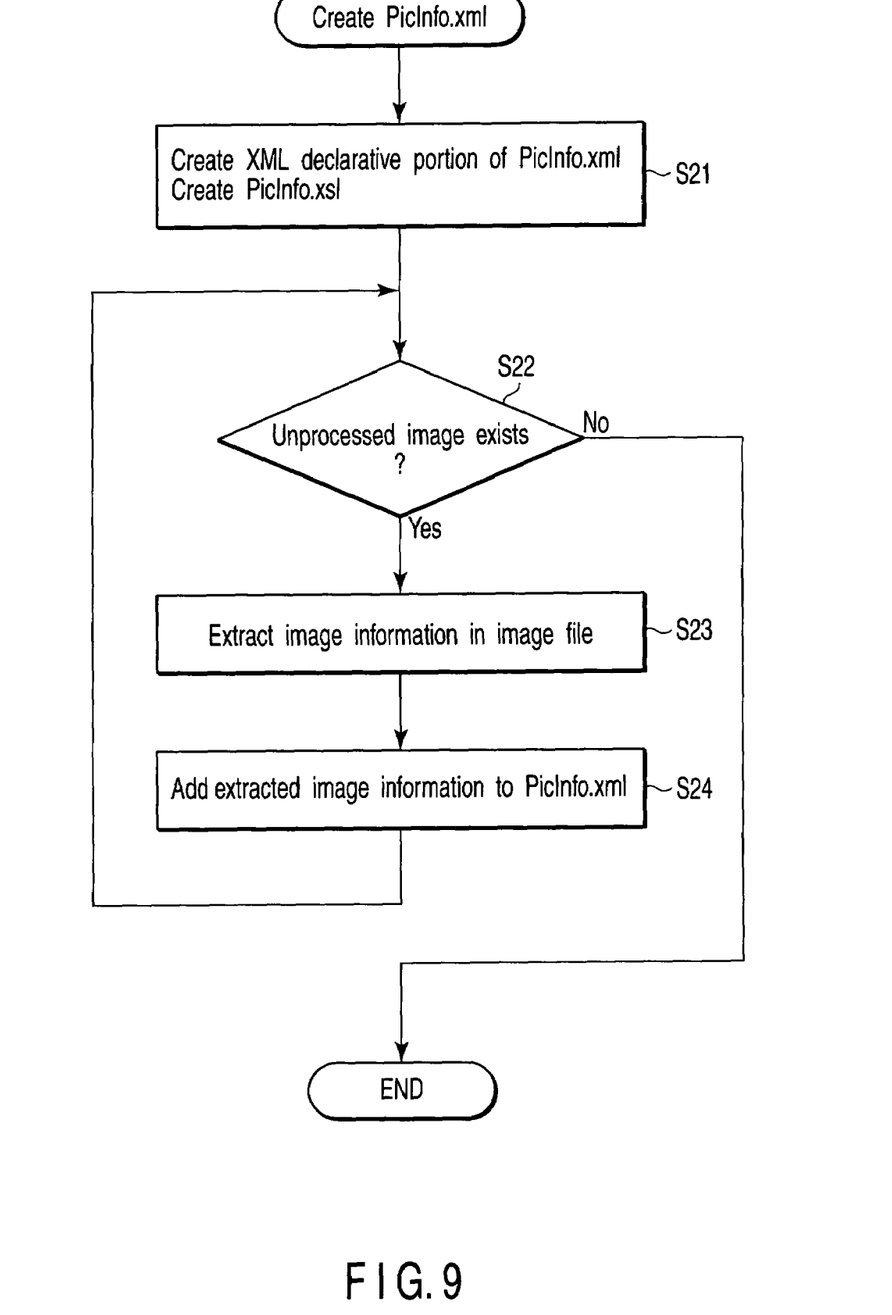
FIG. 9 is a flowchart showing metafile creation processing in the second embodiment according to the present invention.

FIG. 9 is a flowchart showing the metafile (PicInfo.xml) creation processing at step S14 in FIG. 8.

In FIG. 9, the CPU 9 creates an XML declarative portion of the metafile (PicInfo.xml) and an XSL file (PicInfo.xsl) (step S21).

Then, the CPU 9 judges whether an unprocessed image file exists (step S22). Here, the "unprocessed image file" means an image file from which image information is not extracted and in which image information is not added to the image information portion of the metafile (PicInfo.xml). If it is determined that there is an unprocessed image file at step S22, step S22 jumps to step S23, and the CPU 9 extracts image information in the image file (the step S23) and adds the extracted image information to the image information portion of the metafile (PicInfo.xml) (step 24). Then, the processing returns to step S22.

On the other hand, if it is determined that there is no unprocessed image file as a result of the judgment at step S22, the processing of FIG. 9 is terminated.

As described above, according to the second embodiment, in cases where a metafile does not exist when the power supply of the camera is turned on, a metafile is created from image information recorded in an image file. As a result, even if a metafile is accidentally deleted, the metafile can be restored.

It is to be noted that the processing shown in FIGS. 8 and 9 is executed immediately after the power supply is turned on in the second embodiment, but the present invention is not restricted thereto. For example, this processing may be executed at each predetermined time after the power supply of the camera is turned on.

Third Embodiment

A third embodiment according to the present invention will now be described. Since data elements constituting a metafile (PicInfo.xml) are written as text data, a content of the data elements can be readily changed by using, e.g., a text editor. On the other hand, image information recorded in an image file is automatically set in accordance with shooting conditions at the time of image shooting or image processing conditions at the time of image processing. In the third embodiment according to the present invention, image information recorded in an image information portion of an image file is synchronized with image information recorded in an image information portion of a metafile so that the image information can be easily changed by universal means.

Here, it is not preferable that information concerning shooting conditions, e.g., a shooting date and time, a shutter speed in the shooting, an aperture value in the shooting and others is updated since it is information determined in the shooting. Further, it is also desirable that a file name (this file name is a file name automatically given by the camera at the time of image shooting) is not updated in view of retrieval of files and others consideration.

Accordingly, in the third embodiment, even if a data element included in image information of a metafile (PicInfo.xml) is updated, a data element of an image file is prevented from being updated when the updated data element is a predetermined data element. This predetermined data element is information which is mainly determined at the time of image shooting, and includes information concerning shooting conditions, e.g., a shutter speed at the time of shooting, an aperture value at the time of shooting, sensitivity information at the time of shooting, a shooting mode at the time of shooting, a flash mode at the time of shooting or an exposure mode at the time of shooting, file names given to an image file and a metafile at the time of shooting and others events.

The hardware configuration in the camera according to the third embodiment is the same as that described in conjunction with FIG. 1. However, the CPU 9 in the third embodiment includes a function as an update judgment section which judges whether a data element of one of an image file and a metafile is updated and a function as a metadata synchronizing section which achieves synchronization between a data element of an image file and a data element of a metafile.

Figure 10:
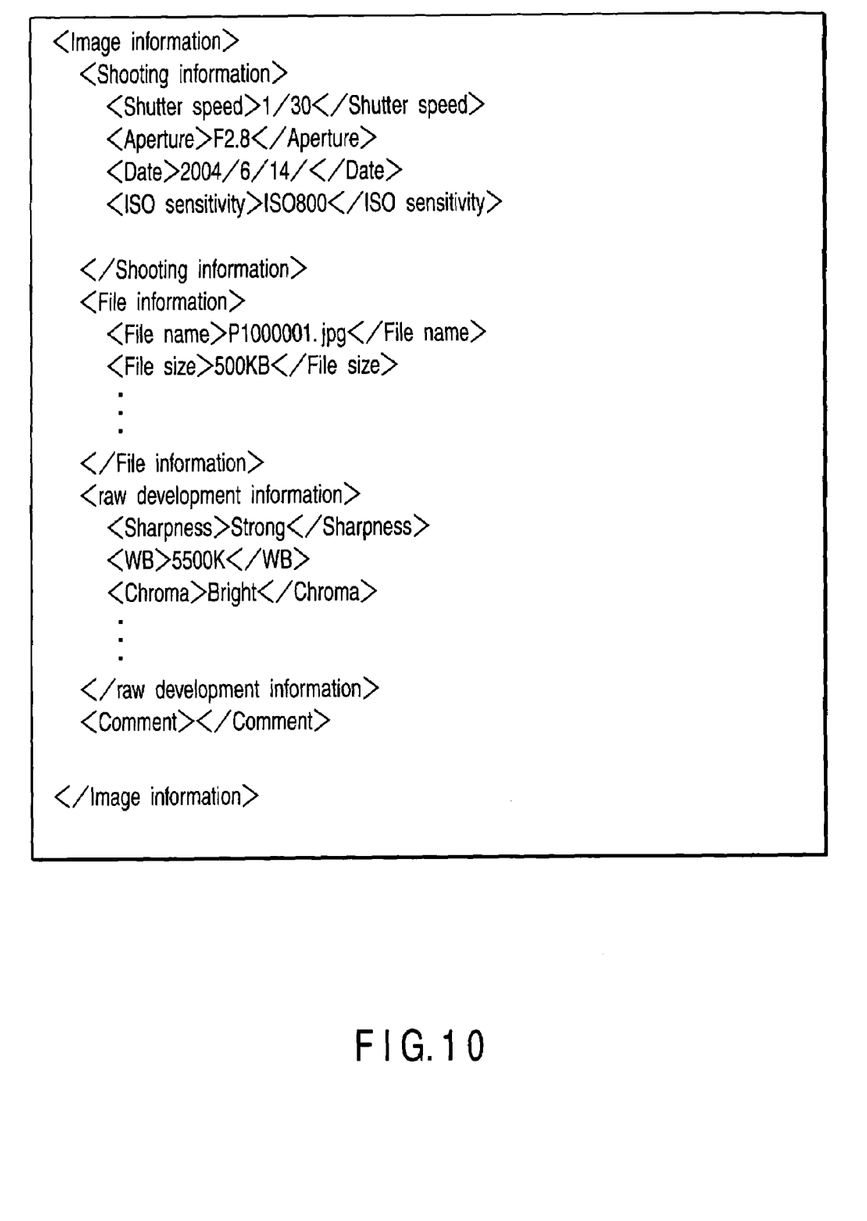
FIG. 10 is a view showing an image information portion concerning raw image data in a third embodiment according to the present invention.

FIG. 10 is a view showing an image information portion which is simultaneously created when raw image data is acquired by the camera according to the third embodiment. In the image information portion depicted in FIG. 10, a raw development information tag and a comment tag are added in addition to the tag depicted in FIG. 3.

The raw development information tag is a tag in which information to which reference is made by a device having an image processing function, e.g., a PC can be written when developing raw image data by the device having an image processing function, e.g., PC. The comment tag is a tag in which can be written a comment with respect to an image file.

Figure 11:
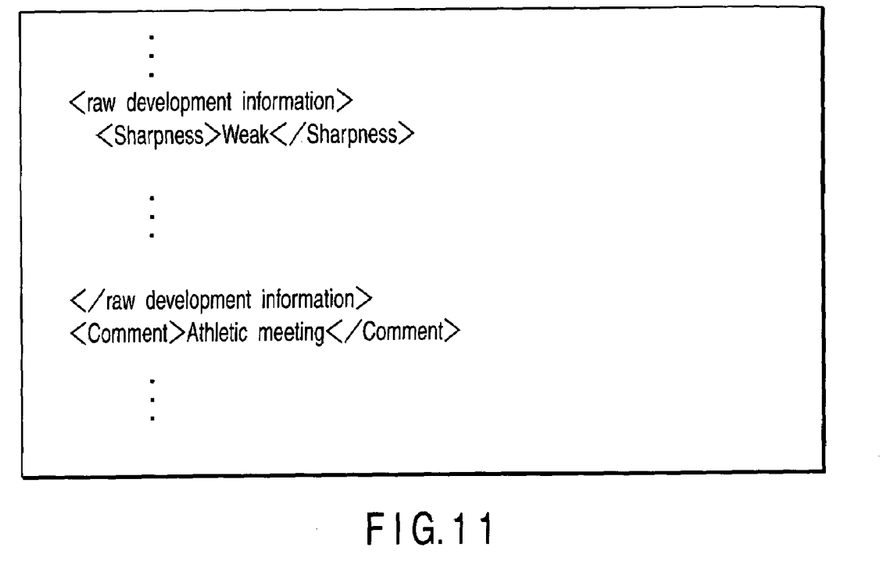
FIG. 11 is a view showing an image information portion when raw development data and a comment are changed.

For example, in cases where the sharpness (an edge emphasizing quantity) when developing raw image data is changed from "strong" to "weak" or where a comment "athletic meeting" is added to an image file, a user changes image information written in the image information portion of a metafile (PicInfo.xml) by using a text editor or the like (see FIG. 11). In the third embodiment, when image information of a metafile (PicInfo.xml) is updated as shown in FIG. 11, image information of an image file is also updated.

Figure 12:
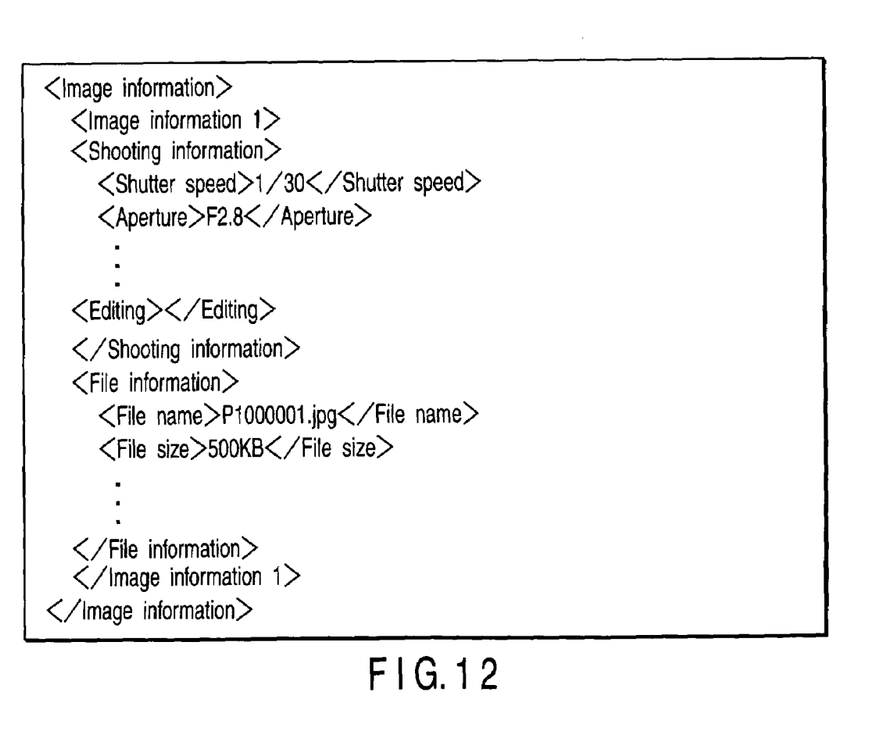
FIG. 12 is a view showing an image information portion concerning JPEG image data in the third embodiment according to the present invention.

Further, FIG. 12 is a view showing an image information portion which is simultaneously created when JPEG image data is acquired by the camera according to the third embodiment. In the image information portion depicted in FIG. 12, an editing tag is added besides the tags depicted in FIG. 3.

The editing tag is a tag in which an editing content is written when still image editing such as realization of a monochromatic image or rotation of an image is carried out.

Figure 13:
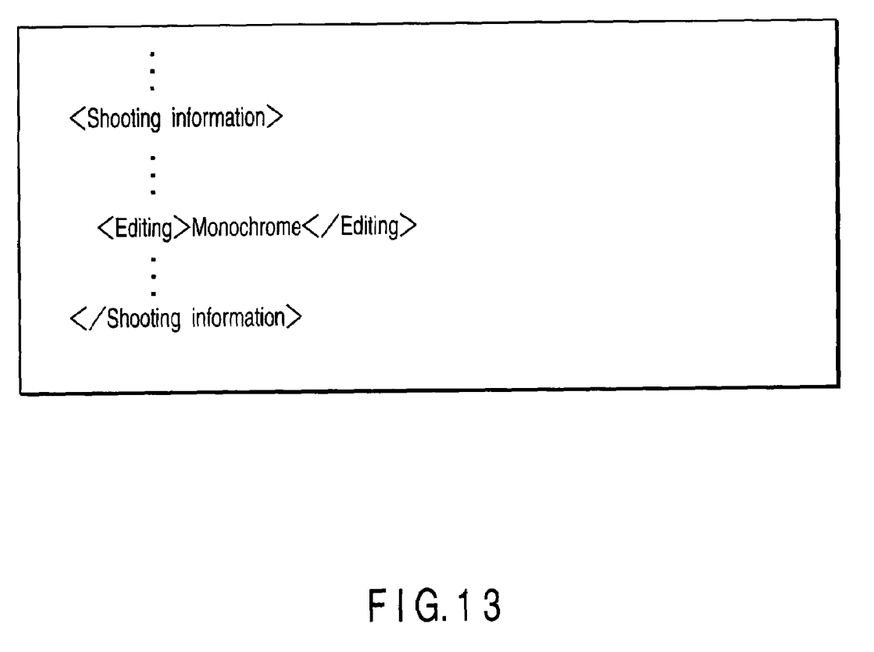
FIG. 13 is a view showing the image information portion when still image edit processing is performed.

For example, when a user performs monochromatic image realization processing with respect to image data, information called "monochrome" is newly written in image information written in the image information portion of an image file (see FIG. 13). Image information written in a metafile is also updated in accordance with this processing.

Figure 14:
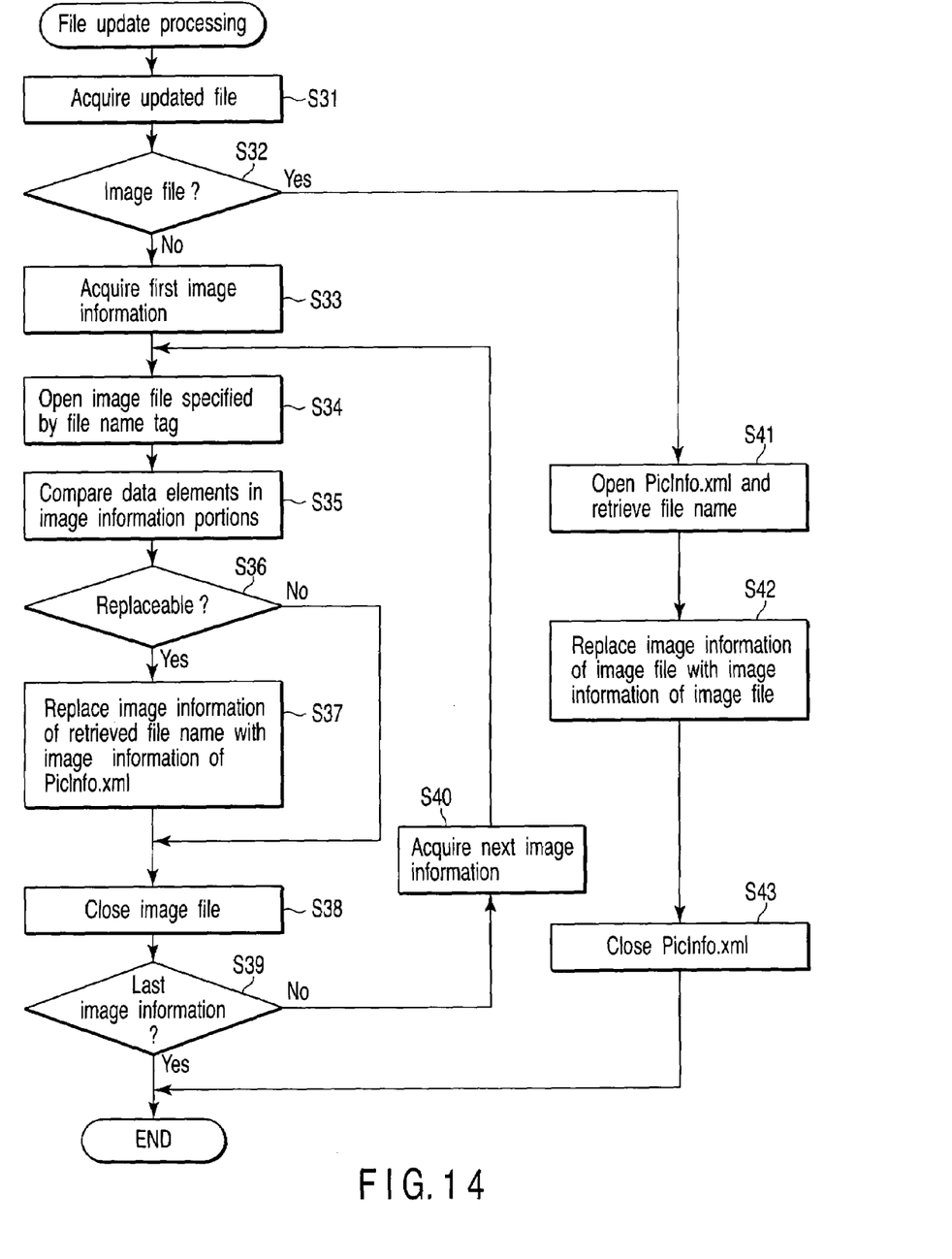
FIG. 14 is a flowchart showing metafile update processing in the third embodiment according to the present invention.

Such file update processing will now be described in detail with reference to FIG. 14. When one of an image file and a metafile is updated, the CPU 9 acquires the updated file (step S31). Then, the CPU 9 judges whether the updated file is an image file (step S32).

If it is determined that the updated file is not the image file, i.e., the updated file is the metafile (PicInfo.xml) as a result of the judgment at step S32, step S32 jumps to step S33, the CPU 9 acquires image information concerning the first shot written in the metafile (PicInfo.xml) (step S33). Then, an image file which coincides with a file name written in a file name tag of the acquired image information is opened (step S34). Further, each data element of image information in this opened image file is compared with each data element of image information in the metafile (PicInfo.xml). Then, a data element which differs between the image information in the image file and the image information in the metafile (PicInfo.xml) is detected (step S35). Subsequently, the CPU 9 judges whether the data element which differs between the image file and the metafile (PicInfo.xml) is a replaceable data element as a result of the comparison at step S35 (step S36).

If it is determined that the data element which differs between the image file and the metafile (PicInfo.xml) is a replaceable data element in the judgment at step S36, step S36 jumps to step S37, the CPU 9 replaces the image information written in the image information portion of the image file with the image information written in the image information portion of the metafile (PicInfo.xml) (step S37), and then the processing advances to step S38. It is needless to say that only the data element which differs between the image file and the metafile (PicInfo.xml) can be replaced at this time.

On the other hand, if it is determined that the data element which differs between the image file and the metafile (PicInfo.xml) is an irreplaceable data element in the judgment at step S36, the processing advances to step S38 without performing replacement of the data element. It is to be noted that replacing the image information of the metafile (PicInfo.xml) with the image information of the image file is more preferable. By doing so, the image information of the image file and the image information of the metafile are always equal to each other.

Then, the CPU 9 closes the image file (step S38). Further, the CPU 9 judges whether the acquired image information is the last image information written in the metafile (PicInfo.xml) (step S39). If it is determined that the acquired image information is not the last image information in the judgment at step S39, step S39 jumps to step S40, the CPU 9 acquires the next image information (step S40), and then the processing returns to step S34. On the other hand, if it is determined that the acquired image information is the last image information in the judgment at step S39, the processing shown in FIG. 14 is terminated.

Furthermore, if it is determined that the updated file is an image file in the judgment at step S32, step S32 jumps to step S41, and the CPU 9 opens the metafile (PicInfo.xml) and retrieves a file name (step S41). Then, image information written in the image information portion under the retrieved file name is replaced with image information written in the image information portion of a corresponding image file (step S42). Thereafter, the metafile (PicInfo.xml) is closed (step S43), and the processing shown in FIG. 14 is terminated.

As described above, in the third embodiment, image information of an image file can be readily updated by achieving synchronization of image information between an image file and a metafile. As a result, by updating raw development information or the like written in, e.g., a metafile by using, e.g., a text editor, the updated content can be also easily reflected on an image file. Consequently, an effect of improving the image quality when, e.g., subjecting raw image data to image processing can be expected.

Moreover, when a data element such as shooting conditions in shooting which should not be updated is updated in a metafile, a data element of an image file is prevented from being replaced, thereby updating appropriate image information only.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A digital camera comprising:
  an image shooting section which obtains at least one set of image data by shooting;
  a processor;
  a metadata creating section of processor-executable instructions which, when executed by the processor, creates metadata comprising a plurality of data elements indicative of information concerning the at least one set of image data obtained by the image shooting section;
  a recording section which records in a recording medium at least one file having a first format in which the metadata is added to the at least one set of image data and a file having a second format comprising the metadata only;
  an update judgment section of processor-executable instructions which, when executed by the processor, judges whether one of the metadata included in the at least one file having the first format and the metadata included in the file having the second format is updated; and
  a metadata synchronizing section of processor-executable instructions which, when executed by the processor, controls the synchronization of the metadata, wherein controlling the synchronization of the metadata includes synchronizing the metadata included in the file having the first format with the metadata included in the file having the second format by replacing the metadata which has not been updated with the updated metadata if the update judgment section judges that one of the metadata included in the at least one file having the first format and the metadata included in the file having the second format is updated, otherwise not synchronizing the metadata.

2. The digital camera according to claim 1, wherein the synchronizing performed by the metadata synchronizing section comprises:
  if the update judgment section judges that the metadata included in the file having the second format is updated, then the metadata synchronizing section:
    (a) compares the metadata included in the at least one file having the first format with the metadata included in the file having the second format in accordance with each data element; and
    (b) for each different data element which exists in the metadata included in the file having the first format and the metadata included in the file having the second format, replaces the metadata included in the file having the first format with the metadata included in the file having the second format if the different data element is not a predetermined data element, and otherwise, replaces the metadata included in the file having the second format with the metadata included in the file having the first format if the different data element is the predetermined data element, otherwise,
  if the update judgment section judges that the metadata included in the file having the first format is updated, then the metadata synchronizing section replaces the metadata included in the file having the second format with the metadata included in the file having the first format.

3. The digital camera according to claim 2, wherein the predetermined data element includes information which is determined when obtaining the image data by the image shooting section.

4. The digital camera according to claim 3, wherein the information determined when obtaining the image data includes a shutter speed at the time of shooting, an aperture value at the time of shooting, sensitivity information at the time of shooting, a shooting mode at the time of shooting, a file name given to the at least one file having the first format at the time of shooting, and a file name given to the file having the second format at the time of shooting.

5. The digital camera according to claim 1, wherein the metadata creating section further creates a file having a third format which is used to display an information concerning the at least one set of image data constituting the metadata in a Web browser, and
  the recording section records the file having the third format in the recording medium.

6. A digital camera comprising:
  an image shooting section which obtains at least one set of image data by shooting;
  a processor;
  a metadata creating section of processor-executable instructions which, when executed by the processor, creates metadata comprising a plurality of data elements indicative of information concerning the at least one set of image data obtained by image shooting section;
  a recording section which records in a recording medium at least one file having a first format in which the metadata is added to the at least one set of image data;
  a metadata judgment section of processor-executable instructions which, when executed by the processor, judges whether a file having a second format comprising the metadata only is recorded in the recording medium, wherein, when the metadata judgment section judges that the file having the second format is not recorded in the recording medium, the recording section creates the file having the second format from the metadata included in the at least one file having the first format and records the created file in the recording medium;
  an update judgment section of processor-executable instructions which, when executed by the processor, judges whether one of the metadata included in the at least one file having the first format and the metadata included in the file having the second format is updated; and
  a metadata synchronizing section of processor-executable instructions which, when executed by the processor, controls the synchronization of the metadata, wherein controlling the synchronization of the metadata includes synchronizing the metadata included in the file having the first format with the metadata included in the file having the second format by replacing the metadata which has not been updated with the updated metadata if the update judgment section judges that one of the metadata included in the at least one file having the first format and the metadata included in the file having the second format is updated, otherwise not synchronizing the metadata.

7. The digital camera according to claim 6, wherein the synchronizing performed by the metadata synchronizing section comprises:

if the update judgment section judges that the metadata included in the file having the second format is updated, then the metadata synchronizing section:
  (a) compares the metadata included in the at least one file having the first format with the metadata included in the file having the second format in accordance with each data element; and
  (b) for each different data element which exists in the metadata included in the file having the first format and the metadata included in the file having the second format, replaces the metadata included in the file having the first format with the metadata included in the file having the second format if the different data element is not a predetermined data element, and otherwise replaces the metadata included in the file having the second format with the metadata included in the file having the first format if the different data element is the predetermined data element, otherwise, if the update judgment section judges that the metadata included in the file having the first format is updated, then the metadata synchronizing section replaces the metadata included in the file having the second format with the metadata included in the file having the first format.

8. The digital camera according to claim 7, wherein the predetermined data element includes information which is determined when obtaining the image data by the image shooting section.

9. The digital camera according to claim 8, wherein the information determined when obtaining the image data includes a shutter speed at the time of shooting, an aperture value at the time of shooting, sensitivity information at the time of shooting, a shooting mode at the time of shooting, a file name given to the at least one file having the first format at the time of shooting, and a file name given to the file having the second format at the time of shooting.

10. An image data recording method comprising:
obtaining at least one set of image data by shooting;
creating metadata comprising a plurality of data elements indicative of information concerning the at least one set of obtained image data;
recording in a recording medium at least one file having a first format in which the metadata is added to the at least one set of image data and a file having a second format comprising the metadata only;
judging whether one of the metadata included in the at least one file having the first format and the metadata included in the file having the second format is updated; and
controlling the synchronization of the metadata, wherein controlling the synchronization of the metadata includes synchronizing the metadata included in the at least one file having the first format with the metadata included in the file having the second format by replacing the metadata which has not been updated with the updated metadata if one of the metadata included in the at least one file having the first format and the metadata included in the file having the second format is judged to have been updated, otherwise not synchronizing the metadata.

11. The image data recording method according to claim 10, wherein the act of synchronizing the metadata comprises:
if the metadata included in the file having the second format is judged to have been updated, then:
  (a) comparing the metadata included in the at least one file having the first format with the metadata included in the file having the second format in accordance with each data element; and
  (b) for each different data element which exists in the metadata included in the file having the first format and the metadata included in the file having the second format, replacing the metadata included in the file having the first format with the metadata included in the file having the second format if the different data element is not a predetermined data element, and otherwise replacing the metadata included in the file having the second format with the metadata included in the file having the first format if the different data element is the predetermined data element, otherwise,
if the metadata included in the file having the first format is judged to have been updated, then replacing the metadata included in the file having the second format with the metadata included in the file having the first format.

* * * * *